(12) United States Patent
Tsukagoshi et al.

(10) Patent No.: US 8,665,966 B2
(45) Date of Patent: Mar. 4, 2014

(54) VIDEO CODING APPARATUS, METHOD OF CONTROLLING VIDEO CODING AND PROGRAM OF CONTROLLING VIDEO CODING

(75) Inventors: Ikuo Tsukagoshi, Tokyo (JP); Shinji Takada, Kanagawa (JP); Koichi Goto, Kanagawa (JP)

(73) Assignee: Sony Corporation (JP)

( * ) Notice: Subject to any disclaimer, the term of this patent is extended or adjusted under 35 U.S.C. 154(b) by 1556 days.

(21) Appl. No.: 10/569,886

(22) PCT Filed: Sep. 2, 2004

(86) PCT No.: PCT/JP2004/013083
§ 371 (c)(1),
(2), (4) Date: Sep. 19, 2006

(87) PCT Pub. No.: WO2005/025226
PCT Pub. Date: Mar. 17, 2005

(65) Prior Publication Data
US 2007/0014355 A1 Jan. 18, 2007

(30) Foreign Application Priority Data
Sep. 2, 2003 (JP) .............................. P2003-310638

(51) Int. Cl.
*H04N 7/12* (2006.01)
*H04N 11/02* (2006.01)
*H04N 11/04* (2006.01)

(52) U.S. Cl.
USPC ............................... 375/240.26; 375/240.01

(58) Field of Classification Search
USPC ..................................................... 375/240.26
See application file for complete search history.

(56) References Cited

U.S. PATENT DOCUMENTS 5,121,202 A * 6/1992 Tanoi ...................... 375/240.16
5,818,969 A * 10/1998 Astle ............................ 382/236

(Continued)

FOREIGN PATENT DOCUMENTS

| EP | 1503595 A3 | 5/2006 |
| JP | 10-200900 A | 7/1998 |

(Continued)

OTHER PUBLICATIONS

Ahmad I et al: "Video Compression with Parallel Processing", Parallel Computing. Elsevier Publishers, Amsterdam, NL. vol. 28, No. 7-8, Aug. 1, 2002, pp. 1039-1078 XP 004375033.

(Continued)

*Primary Examiner* — Chikaodili E Anyikire
(74) *Attorney, Agent, or Firm* — Lerner, David, Littenberg, Krumholz & Mentlik, LLP

(57) ABSTRACT

The present invention realizes a video coding apparatus that is simple in configuration and can avoid video display quality deterioration due to an overrun of video coding processing. The video coding apparatus is provided with a coding means for bringing video into coding processing on a frame basis with a first coding processing method; a processing time detecting means for detecting coding actual processing time required for coding processing on the frame; a delay calculating means for calculating processing delay time of coding processing on the frame based on coding predicted processing time given to the coding processing and the coding actual processing time; a coding load controlling means for, in a case where the processing delay time on the frame is greater than or equal to a predetermined threshold value, causing a subsequent frame to undergo coding processing with a second coding processing method bearing coding processing load lower than in said first coding processing method, and thereby processing time of frames after occurrence of an overrun is shortened for recovery from the overrun so that a frame skip due to occurrence of an overrun is prevented to enable avoidance of video quality deterioration.

11 Claims, 7 Drawing Sheets

(56) References Cited

U.S. PATENT DOCUMENTS

| | | | |
|---|---|---|---|
| 6,584,125 B1 * | 6/2003 | Katto | 370/537 |
| 6,591,014 B1 | 7/2003 | Ueda | |
| 2002/0003576 A1 * | 1/2002 | Konishi et al. | 348/232 |
| 2002/0025001 A1 | 2/2002 | Ismaeil et al. | |
| 2002/0118756 A1 * | 8/2002 | Nakamura et al. | 375/240.17 |
| 2002/0185300 A1 | 12/2002 | Rees et al. | |

FOREIGN PATENT DOCUMENTS

| | | |
|---|---|---|
| JP | 2000-32469 A | 1/2000 |
| JP | 2000-261811 A | 9/2000 |
| JP | 2001-346216 A | 12/2001 |
| JP | 2001-352471 A | 12/2001 |
| JP | 2003-061097 A | 2/2003 |
| JP | 2004-7360 A | 1/2004 |

OTHER PUBLICATIONS

Richardson I E G: "Video Codec Design Passage", Video CODEC Design Developing Image and Video Compression Systems, XX, XX, Jan. 1, 2002, pp. 126-133, XP 002372853.

Supplementary European Search Report EP 04772897, ddated Jun. 27, 2012.

* cited by examiner

VIDEO CODING APPARATUS, METHOD OF CONTROLLING VIDEO CODING AND PROGRAM OF CONTROLLING VIDEO CODING

TECHNICAL FIELD

The present invention relates to a video coding apparatus, a method of controlling video coding and a program of controlling video coding and is suitably applicable to a video coding apparatus of implementing software coding.

BACKGROUND ART

Conventionally, a compressively coding/decoding apparatus on video signals used to implement coding processing (encoding) and decoding processing (decoding) with dedicated hardware for video processing. This is called hardware codec (for example, see Patent Document 1).

In contrast, accompanied by developments of recent computer technologies, coding processing and decoding processing having been described above has been practicalized by executing video processing program on a general-purpose CPU (Central Processing Unit) (this is called software codec).

Unlike a hardware codec, such a software codec is advantageous for its capability of easily resolving internationally standardized compressively coding system or other various compressively coding method such as MPEG (Moving Picture Experts Group) 1/2/4 and JPEG 2000 and the like only by changing a video processing program. In addition, in the case where a new compressively coding method has been developed, only updating a video processing program in accordance herewith can easily resolve the latest compressively coding method.

Patent Document 1 Japanese Patent Laid-Open No. 2003-61097

In software encoding, a CPU processes video coding processing (video coding thread or process) and audio coding processing (audio coding thread or process) alternately in a time-sharing fashion. As for audio, its delay or lack is apt to be perceived by users, and therefore, in general, audio coding thread undergoes processing preferentially. For example, audio covering one frame undergoes processing during one frame period (1/30 second) and thereafter one frame of video undergoes processing.

FIG. 8 shows a processing state of software encoding, and video data as well as audio data inputted from outside are tentatively stored in video input buffer as well as audio input buffer respectively. The CPU at first executes audio coding thread and reads from audio input buffer, compressively codes and thereafter outputs audio data covering one frame. Subsequently, the CPU executes video coding thread, reads from video input buffer, compressively codes and thereafter outputs one frame of video data. Thus, the CPU proceeds with coding audio data as well as video data sequentially on a frame period basis in a time-sharing fashion.

Here, in compressively coding processing on audio, processing time thereof does not change much, but in contrast, in compressively coding processing on video, processing time thereof changes dramatically in accordance with the level of complication on input video (picture or motion and the like) intended to undergo coding.

For example, processing time is short on video that are abundant in comparatively flat parts and less abundant in movement and, in contrast, processing time increases on video including pictures that are complicated and movements taking place far, such as sports broadcasting, that undergoes panning and zoom at an moderate speed. Due to this increase in processing time, there is a case where it becomes impossible to complete coding processing within one frame period. Such processing delay is called overrun.

That is, in FIG. 8, the N-th frame is extremely complicated and coding is regarded to have failed in completion of coding within one frame period (occurrence of an overrun). In this case, completion, by the CPU, of coding processing on the N-th frame subject to occurrence of an overrun will end in cutting into the time to code the N+1-th frame. Here, switching of respective coding threads on audio is normally implemented by context switching by an OS (Operating System).

Here, this frame period is a period to process the N+1-th frame originally, but the frame subject to occurrence of an overrun has undergone processing, the N+1-th frame cannot undergo processing. Therefore, the CPU skips coding processing on the relevant N+1-th frame to implement coding processing from the next N+2-th frame.

Thus, conventional software encoding is designed to-skip coding on the subsequent frame in the case where an overrun has occurred in video coding processing. However, occurrence of such a frame skip will make displayed video in a state of frame-by-frame advance, giving rise to such a problem that display quality of video is harmed.

In order to avoid such an overrun, parallel operation of a plurality of CPUs and increase in clock frequency of a CPU and the like can be considered, but there is a problem that this will make the entire apparatus complicated and will increase in power consumption.

DISCLOSURE OF THE INVENTION

The present invention has been attained in consideration of the above described points and is intended to propose a video coding apparatus that is simple in configuration and can avoid video display quality deterioration due to an overrun of video coding processing, a method of controlling video coding and a program of controlling video coding.

In order to solve such a problem, the present invention is designed to provide a video coding apparatus with coding means for bringing video into coding processing on a frame basis with a first coding processing method; processing time detecting means for detecting coding actual processing time required for coding processing on a frame; delay calculating means for calculating processing delay time of coding processing on the frame based on predetermined coding predicted processing time given to coding processing and coding actual processing time; and coding load controlling means for, in a case where processing delay time on a frame is greater than or equal to a predetermined threshold value, instructing coding means to implement coding processing on a subsequent frame with a second coding processing method bearing coding processing load lower than in the first coding processing method.

In accordance with occurrence of delay in coding processing, controlling to reduce coding load on the subsequent frame makes it possible to shorten frame processing time after occurrence of an overrun so as to recover from the overrun and to prevent a frame skip due to occurrence of an overrun and avoid video display quality deterioration.

In addition, the present invention has been designed to, when an accumulated value of processing delay time on a plurality of frames in succession is greater than or equal to a predetermined threshold value, implement coding processing on a subsequent frame to the relevant plurality of frames in succession with a third coding processing method bearing coding processing load lower than in the second coding processing method.

Even in the case where the value of an overrun is large and recovery from the relevant overrun on one frame has ended in failure, further reduction of coding processing load on onward frames enable concrete recovery from the overrun during a number of frames.

As described above, the present invention can realize a video coding apparatus, a method of controlling video coding and a program of controlling video coding that can control coding load on a subsequent frame to reduce in accordance with occurrence of delay in video coding processing; thereby, shorten processing time of frames after occurrence of an overrun to recover from the overrun; and prevent a frame skip due to occurrence of an overrun and avoid video display quality deterioration.

BEST MODE FOR CARRYING OUT THE INVENTION

Figure 1:
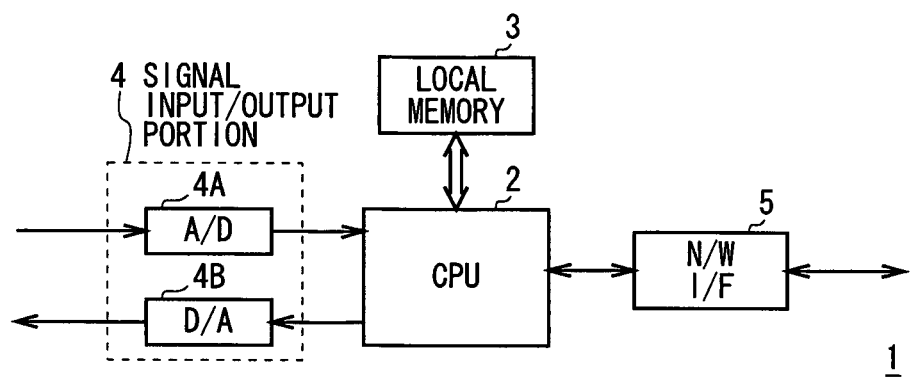
FIG. 1 is a block diagram showing a holistic configuration of a signal processing apparatus according to the present invention.

An embodiment of the present invention will be described on the drawings below.
(1) Holistic Configuration of Signal Processing Apparatus In FIG. 1, reference numeral 1 holistically denotes a signal processing apparatus as a video coding apparatus according to the present invention, and a local memory 3, a signal input/output portion 4 and a network interface 5 are connected to a CPU 2 that controls the relevant signal processing apparatus 1 integrally. The CPU 2 is directly connected to the local memory 3 with a rapid local bus.

And in the signal processing apparatus 1, the CPU 2 is designed to read and execute a codec program stored in ROM (which may be considered a non-transitory computer readable memory or medium) not shown in the drawing and thereby process coding as well as decoding on video as well as audio signals with software.

That is, the signal processing apparatus 1 brings analog video signals and analog audio signals inputted from outside into digital conversion with an A/D (Analog/Digital) converter 4A of the signal input/output portion 4 at the time of coding video and audio, generates digital video data and digital audio data (hereinafter abbreviated to video data and audio data) and tentatively stores them in the local memory 3.

The CPU 2 sequentially reads video data and audio data stored in the local memory 3, and compressively codes them in an internationally standardized compression system such as MPEG 1/2/4 and the like, for example, or in the other various video/audio compression system in accordance with the codec program having been described above and generates coded video data and coded audio data.

And the CPU 2 tentatively stores these coded video data and coded audio data in the local memory 3 and thereafter sequentially reads out and supplies them to the network interface 5. The network interface 5 processes the coded video data and the coded audio data to form packets (packetize) according to a predetermined format to transmit them to external memory media or appliances at the destination of transmission.

On the other hand, the signal processing apparatus 1 brings packetized coded video data and coded audio data supplied from outside storage media and appliances at the source of transmission into recovery (depacketization) with a network interface 5 at the time of decoding video and audio and tentatively stores them in the local memory 3.

The CPU 2 as coding means sequentially reads compressed video data and compressed audio data stored in the local memory 3 and decodes them in accordance with the codec program having been described above to generate video data and audio data.

And the CPU 2 tentatively stores these video data and audio data in the local memory 3 and thereafter sequentially reads out and supplies them to the signal input/output portion 4. A D/A (Digital/Analog) converter 4B of the signal input/output portion 4 brings video data and audio data into analog conversion to generate analog video signals and analog audio signals, and outputs them to outside.

Thus, the signal processing apparatus 1 executes coding processing and decoding processing onto video signals and audio signals with a software codec.

Next, coding processing and decoding processing onto video signals and audio signals with a software codec in the signal processing apparatus 1 will be described in detail with a system diagram shown in FIG. 2.

At the time of coding, the video data and the audio data supplied from the A/D converter 4A (in FIG. 1) of the signal input/output portion 4 are respectively stored in video input buffer 3A and audio input buffer 3B of the local memory 3.

Figure 2:
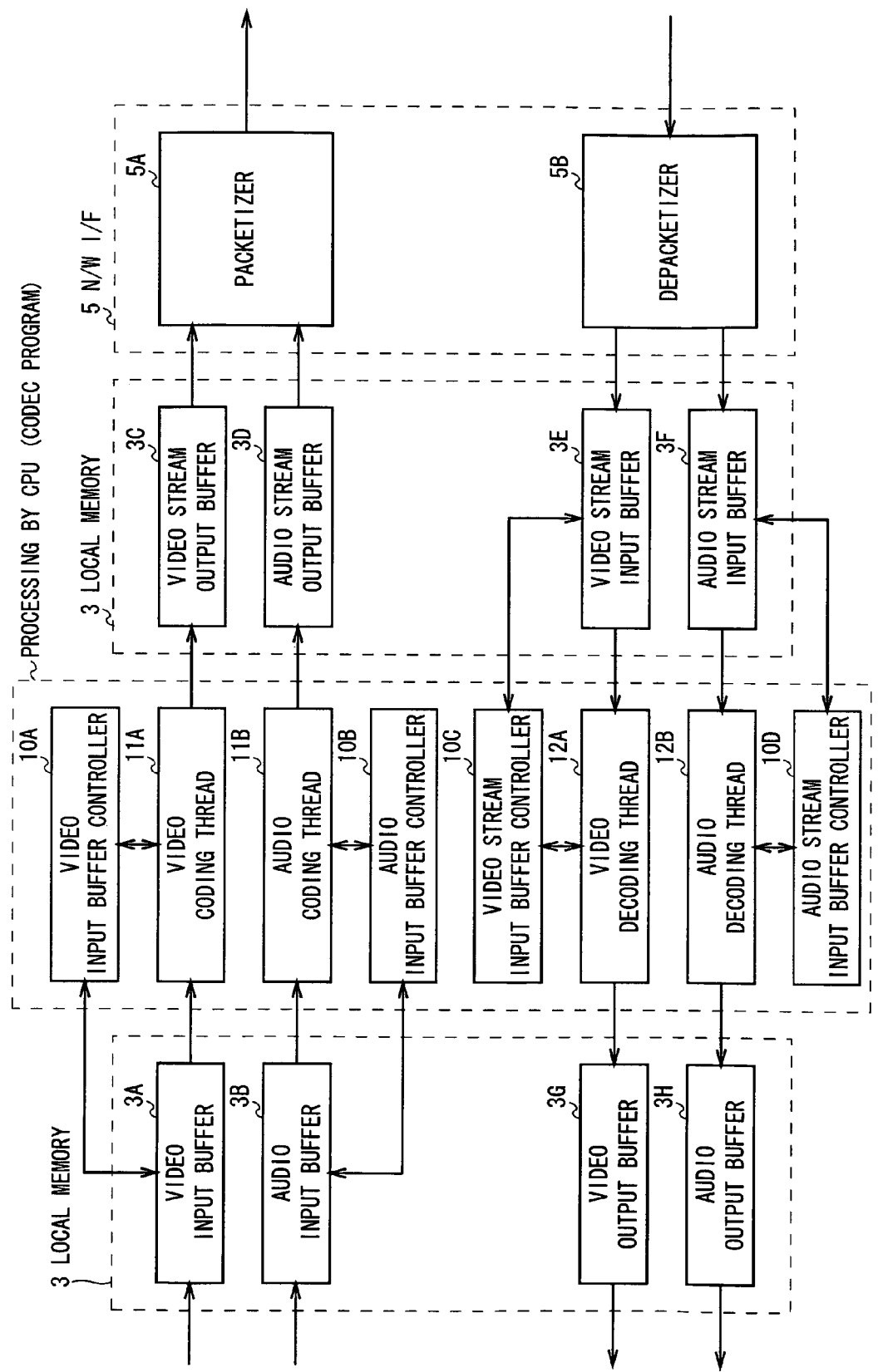
FIG. 2 is a block diagram showing a system diagram of a signal processing apparatus.

In FIG. 2, a video input buffer controller 10A in the codec program executed by the CPU 2 always monitors the video input buffer 3A, and when video data covering one frame are accumulated in the relevant video input buffer 3A having a size covering two frames, transmits a start command to the video coding thread 11A in the codec program in accordance with them, and causes it to transfer the video data covering one frame from the video input buffer 3A to the video coding thread 11A.

The video coding thread 11A reads out video data covering one frame from the video input buffer 3A in accordance with the start command supplied from the video input buffer controller 10A, and compressively codes them to output to a video stream output buffer 3C of the local memory 3 and transmits feedback message as finalization cue back to the video input buffer controller 10A to finalize the thread.

Likewise, an audio input buffer controller 10B in the codec program always monitors the audio input buffer 3B, and when audio data covering one frame are accumulated in the relevant audio input buffer 3B, transmits a start command to the audio coding thread 11B in the codec program in accordance with them, and causes it to transfer the audio data covering one frame from the audio input buffer 3B to the audio coding thread 11B.

The audio coding thread 11B reads out audio data covering one frame from the audio input buffer 3B in accordance with the start command supplied from the audio input buffer controller 10B, and compressively codes them to output to an audio stream output buffer 3D of the local memory 3 and transmits feedback message as finalization cue back to the audio input buffer controller 10B to finalize the thread.

Here, the audio coding thread 11B is processed in priority to the video coding thread 11A.

And, a packetizer 5A of the network interface 5 reads out, packetizes and outputs coding video data and coding audio data from the video stream output buffer 3C and the audio stream output buffer 3D.

On the other hand, at the time of decoding, a depacketizer 5B of the network interface 5 extracts the coded video data and the coded audio data from the packets supplied from outside to store them in a video stream input buffer 3E of the local memory 3 and an audio stream input buffer 3F.

A video stream input buffer controller 10C in the codec program executed by the CPU 2 always monitors the video stream input buffer 3E, and when coded video data covering one access unit are accumulated in the relevant video stream input buffer 3E, transmits a start command to the video decoding thread 12A in the codec program executed by the CPU 2, and causes it to transfer the coded video data covering one access unit from the video stream input buffer 3E to the video decoding thread 12A.

The video decoding thread 12A reads out coded video data covering one access unit from the video stream input buffer 3E in accordance with the start command supplied from the video stream input buffer controller 10C, and decodes them to output to a video output buffer 3G of the local memory 3 and transmits feedback message as finalization cue back to the video stream input buffer controller 10C to finalize the thread.

Likewise, an audio stream input buffer controller 10D in the codec program always monitors the audio stream input buffer 3F, and when coded audio data covering one access unit are accumulated in the relevant audio stream input buffer 3F, transmits a start command to the audio decoding thread 12B in the codec program in accordance with them, and causes it to transfer the coded audio data covering one access unit from the audio stream input buffer 3F to the audio decoding thread 12B.

The audio decoding thread 12B reads out coded audio data covering one access unit from the audio stream input buffer 3F in accordance with the start command supplied from the audio stream input buffer controller 10D, and decodes them to output to an audio output buffer 3H of the local memory 3 and transmits feedback message as finalization cue back to the audio stream input buffer controller 10D to finalize the thread.

(2) Overrun Recovery according to the Present Invention

As having been described above, this signal processing apparatus 1 is designed to prioritize the audio coding thread, at the time of coding and to alternately execute the audio coding thread and the video coding thread respectively covering one frame during one frame period to implement coding processing.

In addition hereto, this signal processing apparatus 1 is designed, in the case where coding delay (overrun) has taken place in video coding processing, to change the thread execution order and reduce loads of video coding processing, and thereby recover from an overrun without implementing a coding skip (hereinafter to be referred to as overrun recovery).

That is, the CPU 2 as processing time detecting means obtains time information in starting timing and ending timing of the video coding thread from a system time clock (not shown in the drawing), and calculates coding actual processing time per one frame from time difference between this starting timing and ending timing. Moreover, the CPU 2 as delay calculating means calculates processing delay time subject to subtraction of coding predicted processing time predicted in advance from this coding actual processing time.

And the CPU 2 as coding load controlling means regards this processing delay time occasionally being larger than "0" as occurrence of an overrun and executes overrun recovery.

Figure 3:
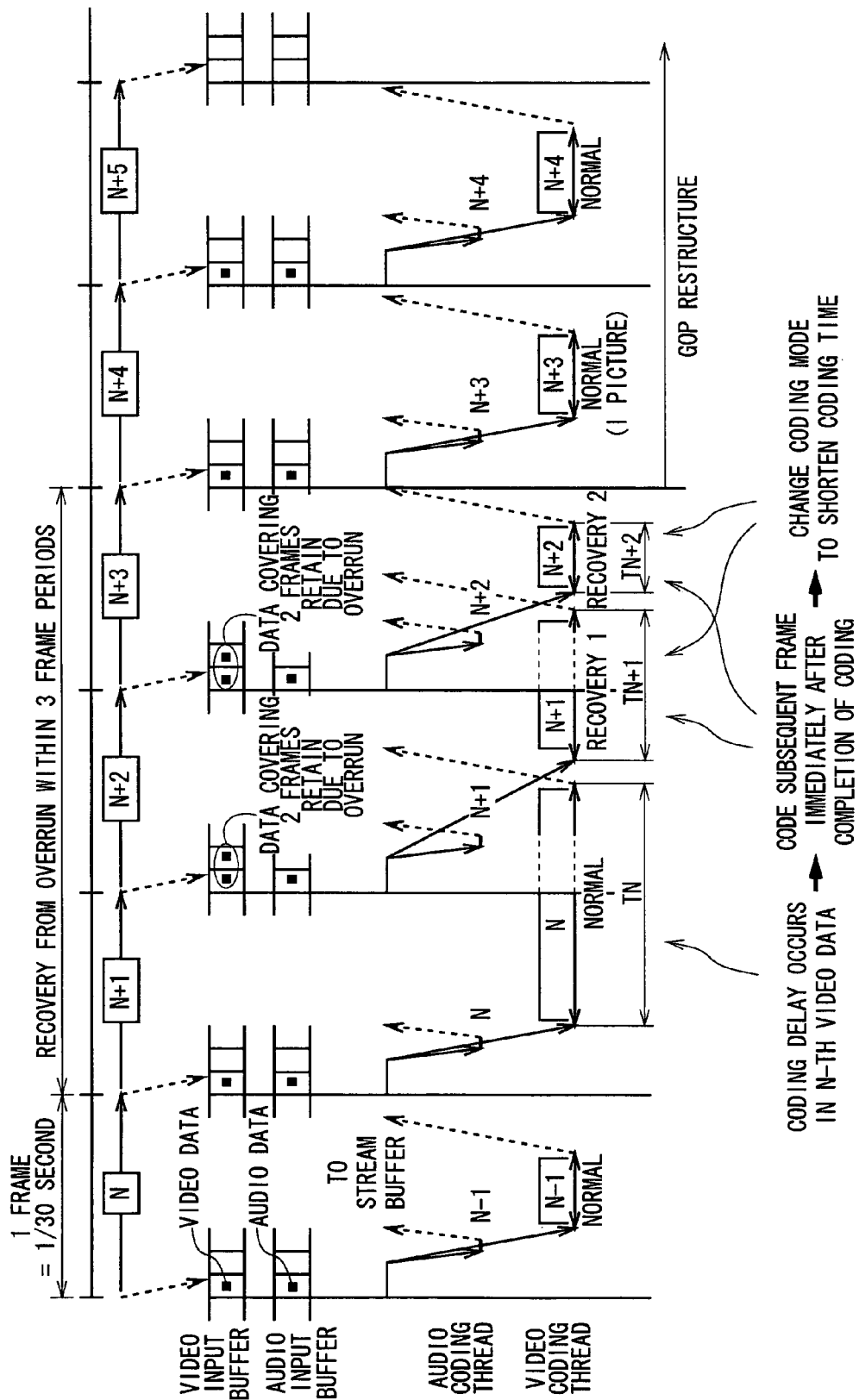
FIG. 3 is a timing chart to serve description of overrun recovery according to the present invention.

Next, a processing example of this overrun recovery will be described with a timing chart shown in FIG. 3. In FIG. 3, suppose coding has not been completed during one frame period since the N-th frame is extremely complicated (occurrence of an overrun). In this case the CPU 2 coding processing on the N-th frame where an overrun has occurred is discontinued as in conventional cases, and during the next frame period, at first, audio data corresponding with the N+1-th frame undergoes coding, and thereafter, coding of video data on the N-th frame where an overrun has occurred is resumed and thereby coding of the relevant N-th frame is finalized.

Figure 4:
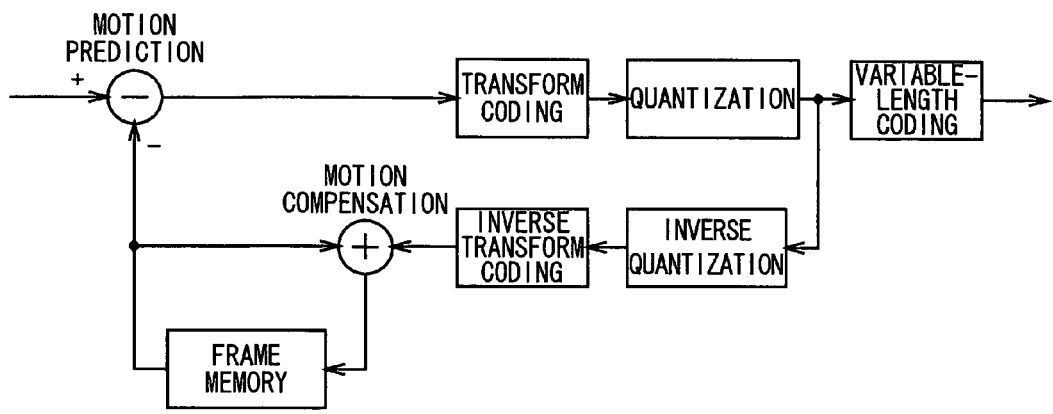
FIG. 4 is a block diagram showing a processing diagram on normal encoding.
Figure 5:
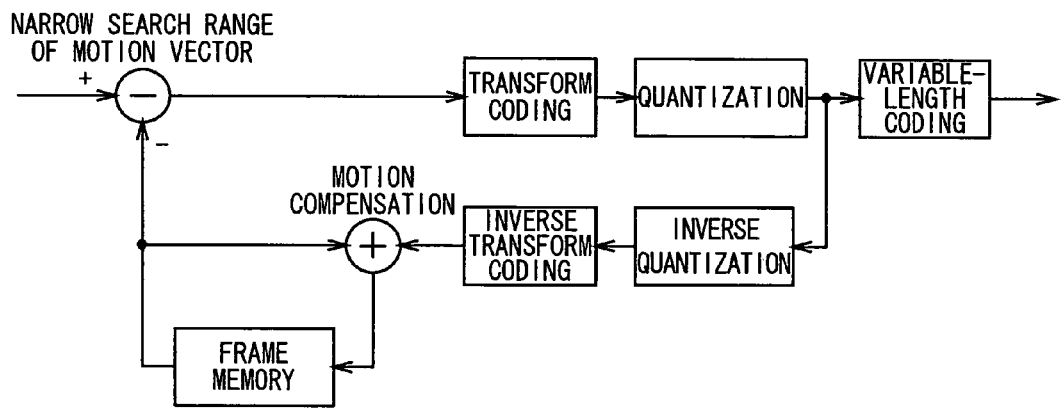
FIG. 5 is a block diagram showing a processing diagram on a recovery encoding mode 1.

Subsequent to completion of coding the resumed N-th frame, the CPU 2 immediately starts coding processing on the N+1-th frame. At this time, the CPU 2 as coding load controlling means applies, to this N+1-th frame, a coding processing method bearing load lower than normal coding processing. This coding processing method bearing load lower than normal will be called recovery encoding mode 1. In contrast, a normal coding processing method will be called normal encoding. FIG. 4 and FIG. 5 show processing diagrams of normal encoding and recovery encoding mode 1.

In this recovery encoding mode 1, the CPU 2 makes a search range of motion vector in prediction coding narrower than in normal encoding, and thereby cuts processing cycles of motion vector searching to reduce processing load, and thereby shortens coding processing time per frame.

Thus, in the case where application of the recovery encoding mode 1 to shorten coding processing time resulted in completion of coding processing of the relevant N+1-th frame within one frame period (not shown in the drawing), the CPU 2 applies normal encoding to the subsequent N+2-th frame and onward to implement processing.

In contrast, as shown in FIG. 3, in the case where application of the recovery encoding mode 1 was planned to shorten processing time and nevertheless the N+1-th frame failed in going through coding (recovery of an overrun was not successful), the CPU 2 tentatively discontinues coding on the relevant N+1-th frame, and at first, codes audio data corresponding with the N+1-th frame during the next frame period, and thereafter resumes coding of video data on the N+1-th frame.

And, subsequent to completion of coding of the resumed N+1-th frame, the CPU 2 starts coding processing on the next N+2-th frame. At this time, the CPU 2 as coding load controlling means applies, to this N+2-th frame, a coding processing method bearing processing load much lower than the recovery encoding mode 1. This coding processing method will be called recovery encoding mode 2.

Figure 6:
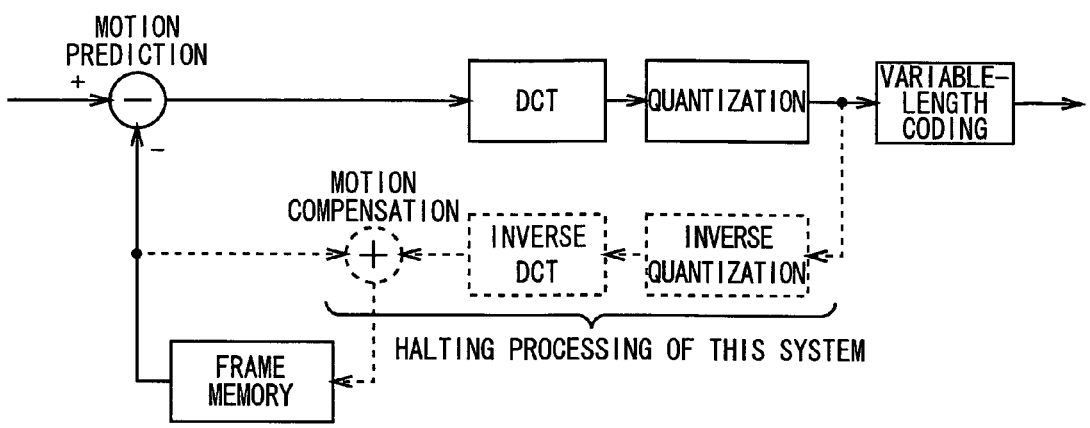
FIG. 6 is a block diagram showing a processing diagram on a recovery encoding mode 2.

In this recovery encoding mode 2, the CPU 2 halts a series of feedback processing system of revitalizing a frame by inverse quantization, inverse transform coding and motion compensation as in a processing diagram shown in FIG. 6. This feedback processing system is a process of restructuring a reference frame onto frame memory in order to predict the next frame. The CPU 2 halts this feedback system in the recovery encoding mode 2 and thereby further shortens coding processing time compared with the mode 1.

Thus, the CPU 2 is designed to recover surely from an overrun within 3 frame periods from occurrence of an overrun by applying a mode 2 bearing further lower processing load to the subsequent frame in the case where application of the recovery encoding mode 1 failed in recovery from overrun.

Here, application of the recovery encoding mode 2 for overrun recovery will give rise to a state where no reference frame for motion prediction is recorded in the frame memory, and thereby the next frame will disable motion prediction in use of this reference frame.

Therefore, in case of having applied the recovery encoding mode 2, the CPU 2 codes the subsequent frame as I picture (intra-coding picture) undergoing no motion prediction, and restructures a GOP (Group Of Picture) with this frame as a starting point.

Figure 7:
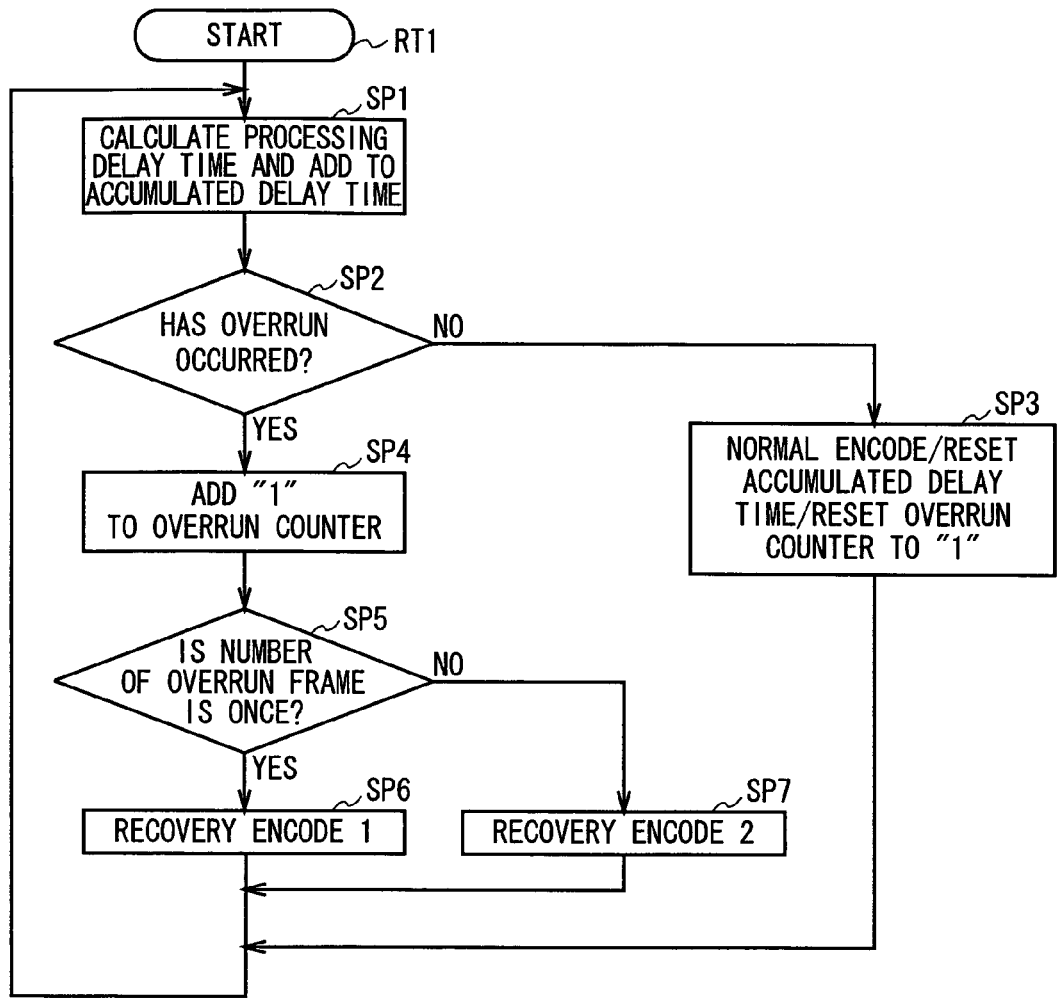
FIG. 7 is a flow chart showing an overrun recovery processing procedure according to the present invention.
Figure 8:
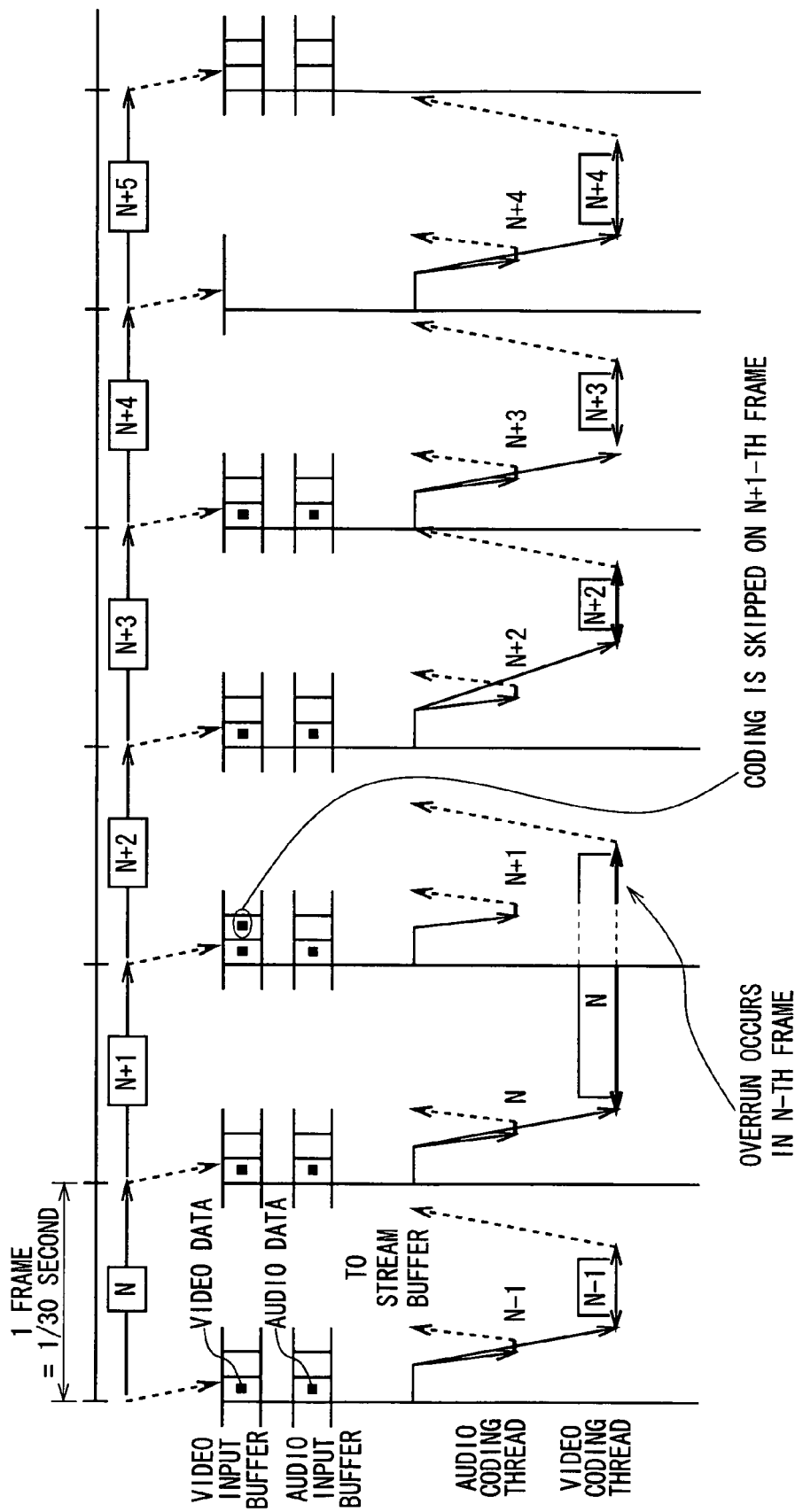
FIG. 8 is a timing chart to serve description of frame skip according to an overrun.

Next, a processing procedure of overrun recovery in the codec program having been described above will be described with a flow chart shown in FIG. 7. The CPU 2 of the signal processing apparatus 1 starts with a staring step in a routine RT 1 and moves to a next step SP1.

In the step SP1, the CPU 2 obtains coding thread ending timing on directly previous video frame and coding thread starting timing on the current video frame directly from an OS (Operation System) or hardware and stores them respectively. And the CPU 2 derives difference between the starting time and then ending time, that is already in storage, on the directly previous frame and thereby calculates processing delay time TN required for coding of the directly previous frame and adds the relevant TN to the overrun accumulated processing time and moves to the step SP2. Here, accumulated processing delay time is set to "0" at the processing starting time.

In the step SP2, the CPU 2 determines presence or absence of occurrence of an overrun from the calculated accumulated processing delay time and a value of an overrun counter.

In the step SP2, in the case where a value derived by dividing the accumulated processing delay time with the overrun counter value is smaller than target time TGT (TarGet Time) given as video coding thread at the system starting time, this indicates that no overrun has occurred, and at this time, the CPU 2 moves to the step SP3 so as to code this frame with normal encoding to reset the accumulated processing delay time to "0" and simultaneously reset the overrun counter to "1" and returns to the step SP1.

On the other hand, in the step SP2, in the case where a value derived by dividing the accumulated processing delay time with the overrun counter value is larger than target time TGT (TarGet Time) given as video coding thread at the system starting time, this indicates that an overrun has occurred, and at this time, the CPU 2 moves to the step SP4 so as to add "1" to the value of the overrun counter for counting the number of frames where overruns have occurred, and moves to the next step SP5.

In the step SP5, the CPU 2 determines the number of frames having undergone an overrun based on a count value of the overrun counter.

In the step SP5, in the case where the number of frame having undergone an overrun is determined to be once, the CPU 2 moves to the step SP6, applies the recovery encoding mode 1 to the subsequent frame to execute coding and returns to the step SP1.

On the contrary, in the step SP5, in the case where the number of frame having undergone an overrun is determined not to be once, the CPU 2 moves to the step SP7, applies the recovery encoding mode 2 to the subsequent frame to execute coding, and moreover designates coding in the I picture to the further subsequent frame and restructures the GOP to return to the step SP1.

(3) Operation and Effects

In the above described configuration, this signal processing apparatus 1 prioritizes the audio coding thread and alternately executes the audio coding thread and the video coding thread respectively covering one frame during one frame period to proceed with coding on video and audio.

And the signal processing apparatus 1 detects occurrence of an overrun in the video coding thread, then in accordance herewith, immediately starts coding the next frame subsequent to the frame subject to occurrence of the relevant overrun. At this time, the signal processing apparatus 1 applies the recovery encoding mode 1 bearing light processing load to the next frame and thereby tries to shorten coding processing time per frame to recover from the overrun.

Moreover, in case of having applied the recovery encoding mode 1 to the next frame and nevertheless failed in recovery from an overrun, the signal processing apparatus 1 applies, to the further subsequent frame, the recovery encoding mode 2 bearing further lighter processing load, and thereby can surely recover from an overrun within a finite frame period from occurrence of an overrun (for example, within 3 frame periods).

In addition, the signal processing apparatus 1 can thus avoid a frame skip due to an overrun, and therefore can reduce processing capacity and clock frequency and the like of the CPU 2 and the peripheries and can reduce the configuration of a system in its entirety and power consumption.

According to the above described configuration, the signal processing apparatus 1 reduces coding processing load on subsequent frames in accordance with occurrence of an overrun, and thereby can avoid video display quality deterioration due to a frame skip.

(4) Other Embodiments

Here, the above described embodiment has been designed to, at first, apply the recovery encoding mode 1 with a search range of motion vectors has been narrowed in accordance with occurrence of an overrun, and in case of failure in recovery from the overrun despite this, further apply, to the subsequent frame, the mode 2 bearing lighter processing load and thereby enable recovery from an overrun within 3 frame periods from occurrence of the overrun, but this recovery period will not be limited to 3 frame periods. In addition, applying the model a plurality of time in succession or applying the mode 2 immediately after occurrence of an overrun and the like, use of a variety of patterns enables reduction of video coding processing load at on and after occurrence of an overrun.

In addition, the above described embodiment has been designed to use two types of recovery encoding, that is, the mode 1 with a search range of motion vectors having been narrowed and the mode 2 with omission of reference frame restructuring processing for interframe prediction, nevertheless the present invention will not be limited hereto, but the other various kinds of coding processing subject to reduction of processing load may be combined for use.

Moreover, in the above described embodiment, a case where the present invention has been applied to a signal processing apparatus having the both functions of coding and decoding on video and audio has been described, nevertheless the present invention will not be limited hereto but may be applied to a signal coding apparatus having only the coding function or only the decoding function.

Industrial Applicability

The video coding apparatus, the method of controlling video coding and the program of controlling video coding of the present invention are applicable to applications such as, for example, real time distribution or reception, through the Internet, of moving pictures digitalized contents or analog video signals subject to digitalization having undergone compressively coding; real time distribution and reception under domestic or limited network environments; and video recorder such as time shifting (PVR: Personal Video Recording).

DESCRIPTION OF SYMBOLS

1 SIGNAL PROCESSING APPARATUS, 2 CPU, 3 LOCAL MEMORY, 4 SIGNAL INPUT/OUTPUT PORTION, 5 NETWORK INTERFACE, 11A VIDEO CODING THREAD, 11B AUDIO CODING THREAD, 12A VIDEO DECODING THREAD, 12B AUDIO DECODING THREAD

The invention claimed is:

1. A video coding apparatus comprising:
coding means for bringing video into coding processing on a frame basis with a first coding processing method;
processing time detecting means for detecting coding actual processing time required for coding processing on said frame;
delay calculating means for calculating processing delay time of coding processing on said frame based on predetermined coding predicted processing time given to said coding processing and said coding actual processing time; and
coding load controlling means for detecting if an occurrence of an overrun has occurred by use of said processing delay time on said frame and, upon detection of the overrun, for (i) completing coding processing on said frame with the first coding processing method during a second frame period which is subsequent to a first frame period during which the coding processing with the first coding processing method on said frame began, (ii) instructing said coding means to implement coding processing on a subsequent frame during the second frame period with a second coding processing method bearing coding processing load lower than in said first coding processing method, such that during the second frame period both the first coding processing method is utilized on said frame and the second coding processing method is utilized on the subsequent frame, (iii) determining if the second coding processing method provided an acceptable recovery from the overrun, and (iv) upon determining that the second coding processing method has failed to provide said acceptable recovery, instructing said coding means to implement coding processing on a further subsequent frame with a third coding processing method bearing coding processing load lower than in said second coding processing method, such that the coding load controlling means is able to cause a recovery from the overrun within three frame periods of an occurrence of the overrun,
wherein the first coding processing and second coding processing comprise prediction coding, and a search range of motion vectors for the second coding processing is narrower than a search range of motion vectors for the first coding processing,
wherein the second coding processing includes an inverse transform operation, an inverse quantization operation, and a motion compensation operation, and the third coding processing comprises halting the inverse transform operation, the inverse quantization operation and the motion compensation operation of the second coding processing.

2. The video coding apparatus according to claim 1, in which
said delay calculating means subtracts said coding predicted processing time given to said coding processing from said coding actual processing time to calculate said processing delay time.

3. A video coding controlling method comprising:
a coding step of bringing video into coding processing on a frame basis;
a processing time detecting step of detecting coding actual processing time required for coding processing on said frame;
a delay calculating step of calculating processing delay time of coding processing on said frame based on predetermined coding predicted processing time given to said coding processing and said coding actual processing time; and
a coding load controlling step of detecting if an occurrence of an overrun has occurred by use of said processing delay time on said frame and, upon detection of the overrun, (i) completing coding processing on said frame with a first coding processing method during a second frame period which is subsequent to a first frame period during which the coding processing with the first coding processing method on said frame began, (ii) causing coding processing to be implemented on a subsequent frame during the second frame period with a second coding processing method bearing coding processing load lower than in said first coding processing method, such that during the second frame period both the first coding processing method is utilized on said frame and the second coding processing method is utilized on the subsequent frame, (iii) determining if the second coding processing method provided an acceptable recovery from the overrun, and (iv) upon determining that the second coding processing method has failed to provide said acceptable recovery, causing coding processing to be implemented on a further subsequent frame with a third coding processing method bearing coding processing load lower than in said second coding processing method, such that the coding load controlling step is able to cause a recovery from the overrun within three frame periods of an occurrence of the overrun,
wherein the first coding processing and second coding processing comprise prediction coding, and a search range of motion vectors for the second coding processing is narrower than a search range of motion vectors for the first coding processing,
wherein the second coding processing includes an inverse transform operation, an inverse quantization operation, and a motion compensation operation, and the third coding processing comprises halting the inverse transform operation, the inverse quantization operation and the motion compensation operation of the second coding processing.

4. A non-transitory computer readable memory having stored thereon a video coding controlling program of causing a video coding apparatus to execute:
a coding step of bringing video into coding processing on a frame basis;
a processing time detecting step of detecting coding actual processing time required for coding processing on said frame;
a delay calculating step of calculating processing delay time of coding processing on said frame based on predetermined coding predicted processing time given to said coding processing and said coding actual processing time; and a coding load controlling step of detecting if an occurrence of an overrun has occurred by use of said processing delay time on said frame and, upon detection of the overrun, (i) completing coding processing on said frame with a first coding processing method during a second frame period which is subsequent to a first frame period during which the coding processing with the first coding processing method on said frame began, (ii) causing coding processing to be implemented on a subsequent frame during the second frame period with a second coding processing method bearing coding processing load lower than in said first coding processing method, such that during the second frame period both the first coding processing method is utilized on said frame and the second coding processing method is utilized on the subsequent frame, (iii) determining if the second coding processing method provided an acceptable recovery from the overrun, and (iv) upon determining that the second coding processing method has failed to provide said acceptable recovery, causing coding processing to be implemented on a further subsequent frame with a third coding processing method bearing coding processing load lower than in said second coding processing method, such that the coding load controlling step is able to cause a recovery from the overrun within three frame periods of an occurrence of the overrun, wherein the first coding processing and second coding processing comprise prediction coding, and a search range of motion vectors for the second coding processing is narrower than a search range of motion vectors for the first coding processing, wherein the second coding processing includes an inverse transform operation, an inverse quantization operation, and a motion compensation operation, and the third coding processing comprises halting the inverse transform operation, the inverse quantization operation and the motion compensation operation of the second coding processing.

5. A video coding apparatus comprising:

a coding unit to bring video into coding processing on a frame basis with a first coding processing method;

a processing time detecting device to detect coding actual processing time required for coding processing on said frame;

a delay calculating device to calculate processing delay time of coding processing on said frame based on predetermined coding predicted processing time given to said coding processing and said coding actual processing time; and a coding load controlling device to detect if an occurrence of an overrun has occurred by use of said processing delay time on said frame and, upon detection of the overrun, for (i) completing coding processing on said frame with the first coding processing method during a second frame period which is subsequent to a first frame period during which the coding processing with the first coding processing method on said frame began, (ii) instructing said coding unit to implement coding processing on a subsequent frame during the second frame period with a second coding processing method bearing coding processing load lower than in said first coding processing method, such that during the second frame period both the first coding processing method is utilized on said frame and the second coding processing method is utilized on the subsequent frame, (iii) determining if the second coding processing method provided an acceptable recovery from the overrun, and (iv) upon determining that the second coding processing method has failed to provide said acceptable recovery, instructing said coding unit to implement coding processing on a further subsequent frame with a third coding processing method bearing coding processing load lower than in said second coding processing method, wherein the first coding processing and second coding processing comprise prediction coding, and a search range of motion vectors for the second coding processing is narrower than a search range of motion vectors for the first coding processing, wherein the second coding processing includes an inverse transform operation, an inverse quantization operation, and a motion compensation operation, and the third coding processing comprises halting the inverse transform operation, the inverse quantization operation and the motion compensation operation of the second coding processing.

6. A video coding controlling method comprising:

bringing video into coding processing on a frame basis;

detecting coding actual processing time required for coding processing on said frame;

calculating processing delay time of coding processing on said frame based on predetermined coding predicted processing time given to said coding processing and said coding actual processing time; and detecting if an occurrence of an overrun has occurred by use of said processing delay time on said frame and, upon detection of the overrun, (i) completing coding processing on said frame with a first coding processing method during a second frame period which is subsequent to a first frame period during which the coding processing with the first coding processing method on said frame began, (ii) causing coding processing to be implemented on a subsequent frame during the second frame period with a second coding processing method bearing coding processing load lower than in said first coding processing method, such that during the second frame period both the first coding processing method is utilized on said frame and the second coding processing method is utilized on the subsequent frame, (iii) determining if the second coding processing method provided an acceptable recovery from the overrun, and (iv) upon determining that the second coding processing method has failed to provide said acceptable recovery, causing coding processing to be implemented on a further subsequent frame with a third coding processing method bearing coding processing load lower than in said second coding processing method, wherein the first coding processing and second coding processing comprise prediction coding, and a search range of motion vectors for the second coding processing is narrower than a search range of motion vectors for the first coding processing, wherein the second coding processing includes an inverse transform operation, an inverse quantization operation, and a motion compensation operation, and the third coding processing comprises halting the inverse transform operation, the inverse quantization operation and the motion compensation operation of the second coding processing.

7. The video coding apparatus according to claim 1, in which the coding load controlling means is able to cause a recovery from the overrun within three frame periods of an occurrence of the overrun.

8. The video coding method according to claim 3, in which the coding load controlling step is able to cause a recovery from the overrun within three frame periods of an occurrence of the overrun.

9. The memory according to claim 4, in which the coding load controlling step is able to cause a recovery from the overrun within three frame periods of an occurrence of the overrun.

10. The video coding apparatus according to claim 5, in which the coding load controlling device is able to cause a recovery from the overrun within three frame periods of an occurrence of the overrun.

11. The method according to claim 6, in which a recovery from the overrun occurs within three frame periods of an occurrence of the overrun.

* * * * *